Patented June 23, 1925.

1,543,157

UNITED STATES PATENT OFFICE.

OLIVER HERZOG, OF BERLIN-DAHLEM, GERMANY.

PROCESS OF OBTAINING SULPHONATED PRODUCTS OF WOOL FAT.

No Drawing.   Application filed January 29, 1925. Serial No. 5,666.

*To all whom it may concern:*

Be it known that I, OLIVER HERZOG, a citizen of the German Realm, residing at Berlin-Dahlem, Germany, have invented certain new and useful Improvements in Processes of Obtaining Sulphonated Products of Wool Fat; and I do hereby declare the following to be a full, clear, and exact description of the invention, such as will enable others skilled in the art to which it appertains to make and use the same.

The process of sulphonating oils such as olive oil, castor oil, etc., has long been known. It is also known how to sulphonate those vegetable fats and oils which consist mainly of glycerides of the fatty acids. It was not heretofore known, however, that both the waxy fraction and also the oily fraction of wool fat, which notoriously contains no glycerin esters, can be sulphonated, and products obtained which form with water emulsions of great stability.

The invention acquires its importance by reason that wool fat, which is obtained in large quantities in wool washing, is a very cheap raw product which does not require to be imported. Emulsions obtained by treating the sulphonated fractions aforesaid can be used in many ways in the textile industry and in the leather industry, as, for example, as a softening medium in softening wool and as a dressing medium in the finishing of cloth.

Soft fat, that is the liquid fraction of wool fat; and hard fat, that is the solid fraction of wool fat; are obtained from saturated solutions of wool fat in acetone or benzine by cooling, whereby the hard fat is first separated out as large readily filterable cakes after which the soft fat in solution is separated from the solvent in the usual manner by distillation in vacuum. In the choice of temperatures used in the separation of the hard and soft fats, regard is to be had to the composition of the wool fat which varies according to the age and origin of the raw wool. Separation may be effected for example at +10° C. From these two intermediate products the sulphonated products, hard and soft fats are obtained in the manner usual in the sulphonation of olive oil. When the sulphonated products are treated with alkalies and organic solvents there are obtained extremely stable emulsions which can be diluted with large quantities of water.

That is to say, sulphuric acid is gradually added separately to either the hard fat or the soft fat portion, while thoroughly stirring, as with olive oil sulphonation but distinguished from that process by allowing the reaction mixture to stand for some time, twelve hours, more or less, to insure complete sulphonation.

The neutralization of the excess acid can be effected by direct addition to the reaction mixture of alkalies, as sodium hydroxide or carbonate, without causing the sulphonated fat to emulsify.

The same is true of the final treatment to remove the last traces of acid and the sodium sulphate formed. This is done with water.

Only after removing the uncombined acid and sodium sulphate is the neutralization of the sulpho-fatty acid ester effected by further addition of alkali, as sodium, potassium or ammonium hydroxides, carbonates or bi-carbonates. This imparts the final emulsifying properties to the product.

The product may be mixed with any quantity of water and form a stable emulsion.

It is also miscible with small quantities of solvent as used in the textile industry, customarily carbon tetra-chloride or tri-chlor-ethylene.

The product, therefore, fills a long felt want, namely, to produce an attenuated, aqueous, fatty emulsion for cloth finishing.

*Example 1.*—1 kilogram of the hard portion of wool fat obtained as previously described is gradually stirred while cooling with 0.2 kilograms of sulphuric acid of 66 Bé. and left standing for 12 hours. There are then added 2 kilograms of water and 0.25 kilograms of 36% soda lye. The liquid is well stirred and washed repeatedly with water to remove residual acid. It is then neutralized with soda lye or ammonia.

*Example 2.*—1 kilogram of the soft portion of wool fat is stirred while cooling with 0.2 kilograms of sulphuric acid of 66 Bé. added in drops. After standing for 12 hours it is washed repeatedly with water and neutralized with concentrated soda solution.

What I claim as my invention is:

1. The process of obtaining sulphonated products of wool fat, consisting in dissolving wool fat in a volatile solvent, separating from one another the waxy and the liquid fractions of the fat by cooling, and sulphonating these fractions separately.

2. The process of obtaining sulphonated products of wool fat, consisting in dissolving wool fat in acetone, separating from one another the waxy and the liquid fractions of the fat by cooling, and sulphonating these fractions separately.

In testimony that I claim the foregoing as my invention, I have signed my name.

OLIVER HERZOG.